United States Patent [19]

Lorenzo

[11] 3,775,752

[45] Nov. 27, 1973

[54] JOB TIME RECORDING AND CALCULATING METHOD AND APPARATUS

[76] Inventor: John L. Lorenzo, 1 West Gilbert Road, Southbury, Conn.

[22] Filed: June 12, 1970

[21] Appl. No.: 45,689

[52] U.S. Cl. .................... 340/172.5

[51] Int. Cl. .................... G06f 3/00

[58] Field of Search .................... 340/172.5

[56] References Cited

UNITED STATES PATENTS

| | | | |
|---|---|---|---|
| 3,303,472 | 2/1967 | Chalker, Jr. et al. | 340/172.5 |
| 3,512,139 | 5/1970 | Reynolds, Jr. et al. | 340/172.5 |
| 3,406,387 | 10/1968 | Werme | 340/172.5 |
| 3,351,912 | 11/1967 | Collom et al. | 340/172.5 |
| 3,380,031 | 4/1968 | Clayton et al. | 340/172.5 |

*Primary Examiner*—Harvey E. Springborn
*Attorney*—Arthur J. Plantamura

[57] ABSTRACT

A particular embodiment provides a time recording and computing apparatus which accepts and holds in memory the result of a single calculation or a series of calculations based on time inputs such as an employee's hours on the job. The calculations may be based on differentials from a first time indication derived from an input device, e.g. a coded card or keyboard and a second time indication from the same or similar device. The system calculates and holds in memory the differences in time inputs for each particular input. The apparatus is arranged to display, to print out or store on other media such as magnetic tape, punched tape, etc., information computed from the time inputs so that an entire payroll may be processed automatically for a variety of employee grade levels. Also, time chargeable to a particular job may be displayed, printed out, or stored at any stage in the job, thereby preventing excessive time allocations to that job. Being thus alerted, further expenditures of time beyond that permissible for that job may be stopped. Also, a more accurate record of labor expended for a particular job is available for future bidding on similar jobs.

10 Claims, 10 Drawing Figures

INVENTOR.
JOHN L. LORENZO
BY
Arthur J Plantamura
ATTORNEY.

INVENTOR.
JOHN L. LORENZO

BY:
Arthur J. Plantamura
ATTORNEY.

INVENTOR.
JOHN L. LORENZO
BY
Arthur J. Plantamura
ATTORNEY.

INVENTOR.
JOHN L. LORENZO
BY: Arthur J. Plantamura
ATTORNEY.

INVENTOR.
JOHN L. LORENZO
BY:
Arthur J. Plantamura
ATTORNEY.

INVENTOR.
JOHN L. LORENZO

BY: Arthur J. Plantamura
ATTORNEY.

JOB TIME RECORDING AND CALCULATING METHOD AND APPARATUS

FIELD OF THE INVENTION

This invention relates to data processing and computing methods and apparatus and, more particularly, to a technique for converting time-dependent data inputs into processed financial information, and the like.

SUMMARY OF THE PRIOR ART

Generally, with time clocks for recording employees' hours on the job, a record card is inserted into the time clock and the time of insertion printed and/or punched onto the card on spaces suitably provided thereon, the time usually being indicated in hours and minutes or hours and decimal fractions of hours. Experience has shown that evaluation of imprinted cards is tedious and mistakes are likely to occur. Also, punched cards require the manual handling of cards in a time-consuming operation, or the use of a card reader, and/or substantial investment in a computer or computer facility. Accordingly, a need exists to provide a time recording and calculating system of the kind, with which the present invention is concerned, for registering times in a memory, means for the purpose of withdrawing the data in order to calculate the number of hours an employee has worked or has spent on a particular job, and to register or display computed information, based on such hours on the job, upon command.

SUMMARY OF THE INVENTION

It is an object of this invention to provide a time recording device which will accept and store or hold in a memory means, one or more time-dependent data inputs from a card, keyboard or other input source; hold in memory the first input data and subsequently accept second data inputs from the same source and then process or combine these data, such as, for example, by calculating the elapsed time between the first and second data inputs and storing that time difference in memory; this sequence or cycle being repeatable as often as necessary during any period.

It is a further object of this invention to provide a record via display or other readout or hard copy of the information stored in the memory, and processed data based upon the information stored, such as gross wages, FICA withholdings, income tax withheld, insurance, net pay, etc., or time spent on a particular job by one or several workpeople, or job cost based on different rates for various workpeople. In this way, for example, an employer may process an entire payroll without the manual processing of the time cards and without accounting or clerical computation of individual periods of employment for each employee.

Still an additional object of the invention is to afford means by which an employer may keep an accurate record of labor costs for a particular job, at every stage in its progress, without need for time-consuming and error-prone clerical paper work which usually is not kept current because of practical difficulties.

In accordance with the invention, a time recording device responds to manually and automatically entered input data by storing a representation of the time input. In response to a second data input, the device automatically processes the data so stored to produce output information that corresponds to the elapsed time on the job, net pay, and the like.

More particularly, the system of the invention may employ keyboard switches whose function and configuration are conventional such as those manufactured, for example, by Micro Switch, Division of Honeywell, Inc., Freeport, Ill., Licon Division of Illinois Tool Works, Chicago, Ill., and Ikor, Inc., Burlington, Mass. These keyboard switches are use for access to the memory of a computer into which the various time inputs have been The switches are used to obtain stored data from memory, or to enter data, e.g. changes in wage scale, tax withholding, etc. into, the memory. The keyboard switches may be at a location remote from the time clock(s) or job units and/or memory device(s). The keyboard consists of, but is not limited to, switches for the digits 0 to 9, for the (+), (−), (×), (÷), (i.e., the addition, subtraction, multiplication and division functions, respectively) plus other appropriate switches which allow the operator to select various different modes of operation including but not limited to calculate, edit, enter data, select item, select employee, read manual, read automatic, etc.

The time clock is a unit which displays current time in hours and minutes and which may be capable of printing or indicating time on pre-ruled cards in various sections of the card, as a conventional time clock such as described in U. S. Pat. No. 3,156,518, to M. Bud. In addition, the unit is capable of detecting differently coded cards and transmitting either card identification and time, or only card identification, to a central processing unit.

The system functions by introducing a given time input, for example, such as by a worker inserting a card or other data source (coded for identification) into a time clock or job time input clock or similar device or by selecting an appropriate address on the keyboard. In the case of an employee's time card, a switch is actuated by the card; this causes the time clock portion of the system to read the card for worker identification, and to send this data to the central processing unit which enters the time of card insertion into the proper memory location. The time of card insertion may be obtained from one central unit in the central processor or from a remote unit. An input from a job time control unit functions similarly. In the case of entry through the keyboard, the proper item for entry is selected through an appropriate switch or switches. The data is then entered by simple switch manipulation.

Both the time clock and the job time unit are not necessary for proper system operation; either or both may be used. On the next occasion in which the same card or data source is inserted into the time unit, the central processing unit retrieves from memory the previously stored time for that card and calculates the difference in hours and minutes or hours and decimal fractions of hours between that time and the current time and applies appropriate multipliers if needed for overtime, double time or premium rate. The central processing unit holds this data while also retrieving from memory any previously accumulated time for that particular card or item. Such time intervals are added together and placed back in memory while the primary location which held the initial time of card insertion or entry is cleared for the next time. Hence, a running total of accumulated time is kept permanently in one memory location while another memory location stores temporarily the initial time at which a card is inserted or keyboard entry made. Other data, calculated through the identification read from the inserted coded card, such as total labor cost for a job, based on employee's wage rate (which preferably is coded on the card), hours worked, and the time, may also be stored concurrently in other memory locations.

At the end of an appropriate period of time, such as the end of a payroll period or job, an operator selects an appropriate code on the keyboard for readout and the system will either display (via nixie, cold cathode, or other readout type devices or cathode ray tube display), or print out, or store on other media such as magnetic or paper tape, automatically, all or any of the data and information desired based upon the inputs. For example, a pre-ruled form such as a payroll check stub could be printed. After print out the memory may be cleared for the next period.

Any or all data required to perform calculations with the stored cumulative time may be entered at a convenient time through the keyboard or via the card or by any appropriate means. Editing or correcting data is also facilitated through the keyboard. This data may also be stored in memory permanently so that it is necessary only to update at various times, when for example, a worker's wage rate changes or the number of a worker's dependents changes, etc.

BRIEF DESCRIPTION OF THE DRAWINGS

The several features and advantages of the invention will become more apparent to those skilled in the art by reference to the detailed description which follows taken in conjunction with the several figures of the drawing in which.

DESCRIPTION OF THE PREFERRED EMBODIMENT

Figure 1:
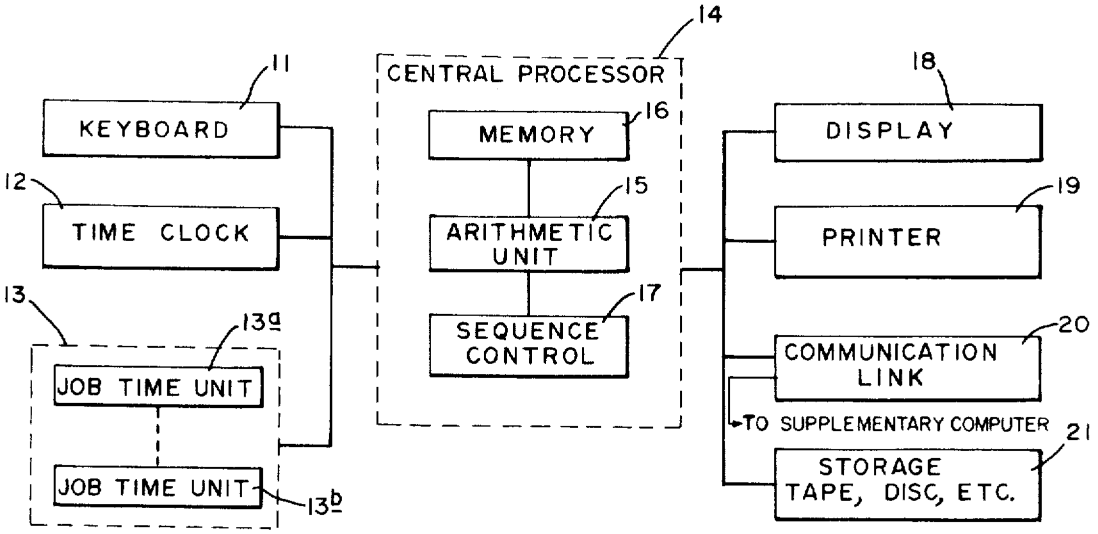
FIG. 1 is a block diagram showing the several component parts of the system of the invention.

Referring to the diagram of FIG. 1, the several components are shown in block form and comprise a keyboard 11 which may be situated at a location remote from the time clock 12 and one or more units 13*a* and 13*b* of a job time input unit 13.

The job time input unit(s) 13 may consist of one or more time clock(s) capable of accepting coded cards, and transmitting card identification and any other pertinent data, to a central processing means or unit 14. The time clock 12 may transmit data to unit 14 in a similar manner.

The central processor 14, consists of an arithmetic and interface means or unit 15, capable of performing the four basic operations of addition, subtraction, multiplication, and division, and containing the necessary routing circuitry to provide communication between the other parts of the system.

Also incorporated in the central processor 14 is an expandable memory means or section 16. Additional memory capacity may be added as needs require depending upon options desired and the system size which is warranted. The memory unit 16 may comprise a plurality of individual units and may be, for example, of the magnetic core, tape, disc or drum type, optical, semi-conductor, or any other suitable storage media. A typical unit would be Ferroxcube Corporation's FI-1 magnetic core memory.

The sequence control means or section 17 may also be a modular section. A sequence control is required for basic system features and as other features are desired, additional sequence controls may be added to implement their needs. In accordance with one aspect of the invention, it is the sequence control 17 that recalls data from the memory 16 which is specific to the input source or other identification indicia that initiated the recall cycle. The sequence control 17, moreover, initiates the time difference computation based on the two successive data inputs from the same source, as well as the recall of the accumulated time information and the addition of the new elapsed time to this cumulative value for further storage.

A display 18 is employed as one means for obtaining data from the system. This display is an integral part of the keyboard 11 but if desired may be separately situated. The display 18 may be of the Burroughs Corporation nixie type, cathode ray tube, or any other suitable means of display.

A printer 19 is a means of obtaining a permanent record of data from the system. Data pertinent to job and employee is printed upon actuation of the print switch 26 (FIG. 2), also shown as 41 in FIG. 3.

An auxiliary storage unit 21, utilizing magnetic tape, disc, etc., may also be added for permanent record of data, or for transporting data to other devices.

The keyboard unit 11 (FIG. 2) is made up of a display panel 18 consisting of eight nixie type indicator tubes 22 or other type of digital readout device such as Raytheon Corporation Datavue tube or RCA Numitron Model DR 2010 tube. Appropriate conventional drive circuitry and decoding means for the readout is also incorporated.

The keyboard comprises an array of keys and is divided, for purposes of description, into a left section 23 and a right section 24. The several switches 25 and 26 are of commercially available type such as Raytheon Corporation 3-ounce keyboard switch or any other suitable keyboard switches such as those manufactured by George Risk Industries or Micro-Switch Division of Honeywell Corporation. They are grouped into two sections: the switches 25 in the left section 23 of the keyboard are arranged in a typical desk-top calculator fashion; the keys 26 in the right-hand section 24 are arranged for access to the computer's memory for obtaining stored data or for entering data into memory.

Figure 3:
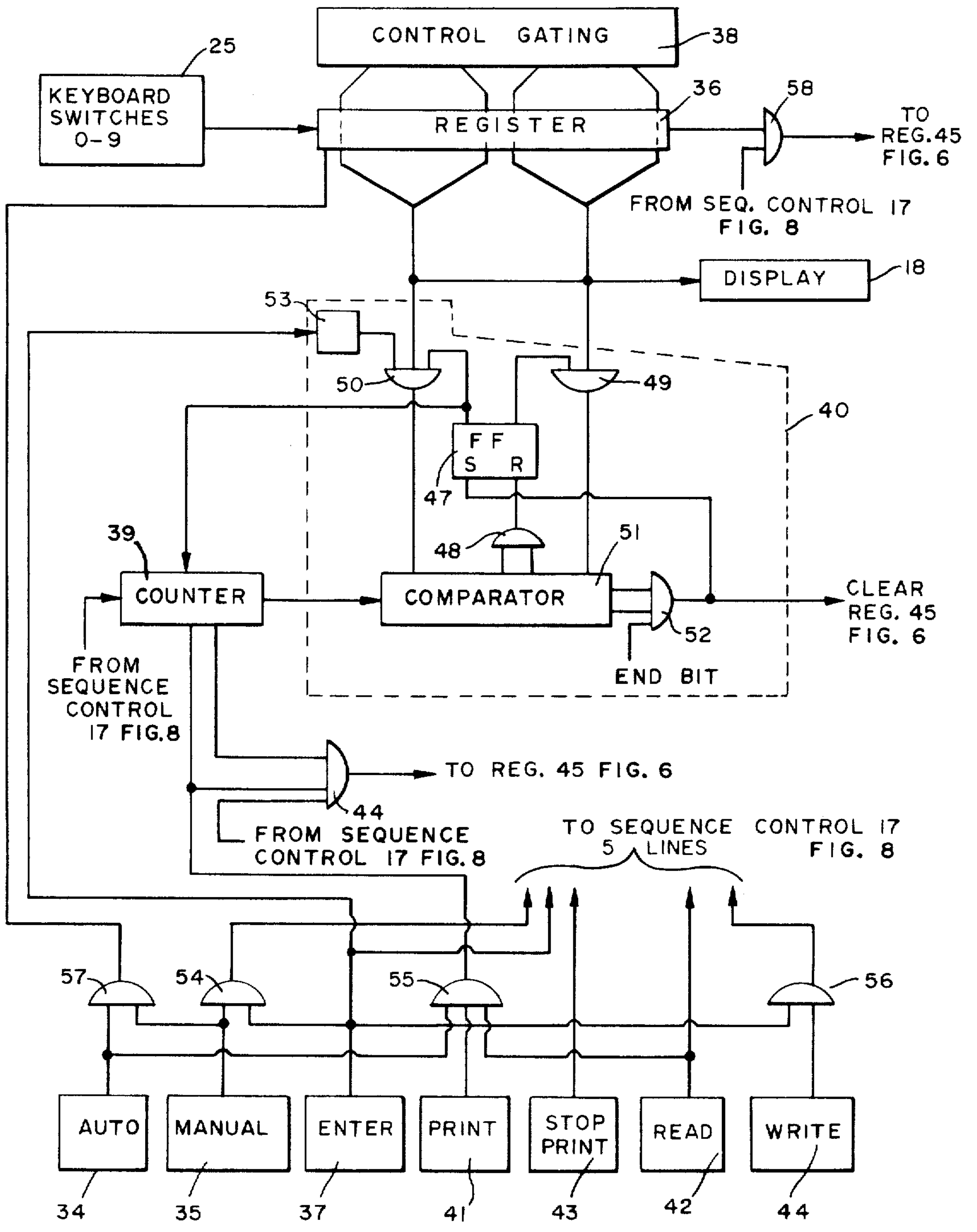
FIG. 3 is a block circuit diagram of the keyboard, readout and/or printing control constructed in accordance with the teaching of the invention.

As illustrated in FIG. 3, there are two modes of operation for the computer; the automatic mode, selected by switch 34, and the manual mode, selected by switch 35, either of which will enable register 36 through OR gate 57. In the automatic mode, selected by depressing auto switch 34, automatic printout of data is achieved by first selecting the item number desired to start the print, using the key switches 25, in keyboard 11. This enters the selected item number into the entry register 36, which for the auto mode is divided into two equal sections of four binary coded decimal (BCD) digits each. The start item is first loaded into the right half of the register. The enter switch 37 is depressed and the start item is transferred to the left half of the entry register through appropriate gating 38. Data in the entry register is displayed via the display unit 18. Next the desired end of print item number is selected by switches 25 in the keyboard 11. Again the number enters the right half of the entry register 36, while the start item is shifted so as to appear in the left half after entry of the end of print item.

While register 36 is being manually loaded via the key sections 23 and 24 (FIG. 2), counter 39 is free running. Gate 50 has been conditioned to pass data while AND gate 49 has been closed to block data by a signal from the flip-flop 47. When the enter switch 37 is again depressed, circuit 53 generates a pulse which enables gate 50 and allows comparison to occur in comparator 51 between the data in the left half of register 36 and the input from counter 39. When comparison occurs, comparator signals enable an AND gate 48 to pass a reset pulse to the flip-flop 47. The flip-flop 47 is reset and immediately closes gate 50, enables gate 49, stops counter 39, and puts it under control of sequence control 17. Data (end of print) from the right side of register 36, that is, the desired end print item is then allowed to enter the comparator 51 through the enabled gate 49. A print cycle is initiated by depressing both the print switch 41 and the read switch 42 simultaneously. An output from AND gate 55 causes the counter 39 to transmit a function code through enabled AND gate 44 and to register 45 (FIG. 6) in the arithmetic unit. The function code is directed to the program sequence control 17 (FIG. 8) where a particular sequence of control functions is begun (operation of the sequence control is discussed in another section). The data associated with the desired item is transferred from the memory to the arithmetic unit where various manipulations and calculations are performed, all under direction from the sequence control 17. After all data associated with the first item is processed and printed out, the sequence control 17 advances counter 39 to the next item and the cycle repeats as often as necessary until a second comparison occurs in comparator 51, between the end item data in the right half of register 36 and the counter 39 indicating that the desired stop point has been reached. At this time sequence control 17 is stopped and reset. Also, when this occurs, gate 52 is conditioned to open and when the end bit from the sequence control 17 occurs, to indicate that the last item has been printed or stored, gate 52 is enabled and passes a pulse, clearing register 45 (FIG. 6), setting flip-flop 47 (FIG. 3) back to its original state, which starts counter 39 free running, closes gate 49 and conditions gate 50 in order to restore the system to a condition in which it can once more receive a start item. At any time during the print cycle an override switch, stop print 43, may be depressed to stop and reset the sequence control 17 which causes the printer to stop.

In the manual mode, FIG. 3, when the manual switch 35 is depressed, the desired item number which is to be read, altered, or entered, is again selected by keys 25 in keyboard 11. The number first enters the entry register 36 and is displayed. When enter switch 37 is depressed a pulse from AND gate 54 causes the sequence control 17 (FIG. 8) to direct the number from the register 36 through gate 58 (FIG. 3) to register 45 (FIG. 6) in the arithmetic unit. Through appropriate decoding 88 and gating 86 and 87, the sequence control also controls the memory address register 77 in the memory 16. If it is desired to know the contents of that memory location, or information based on data in that location, read switch 42 (FIG. 3) is depressed which causes the sequence control 17 (FIG. 8) to direct the data from memory 16 to the arithmetic unit where, if necessary, calculations are performed and the result directed to register 36 in the keyboard unit where it is displayed.

If, on the other hand, the data stored in memory is not desired but is to be altered or new data entered, the data to be entered is selected by the keys 25 in keyboard 11 and then the write switch 44 and enter switch 37 are depressed simultaneously, which enables AND gate 56 and causes the sequence control 17 to cycle so as to write the data into memory 16. This will automatically cause any data previously stored in that location to be erased.

Figure 6:
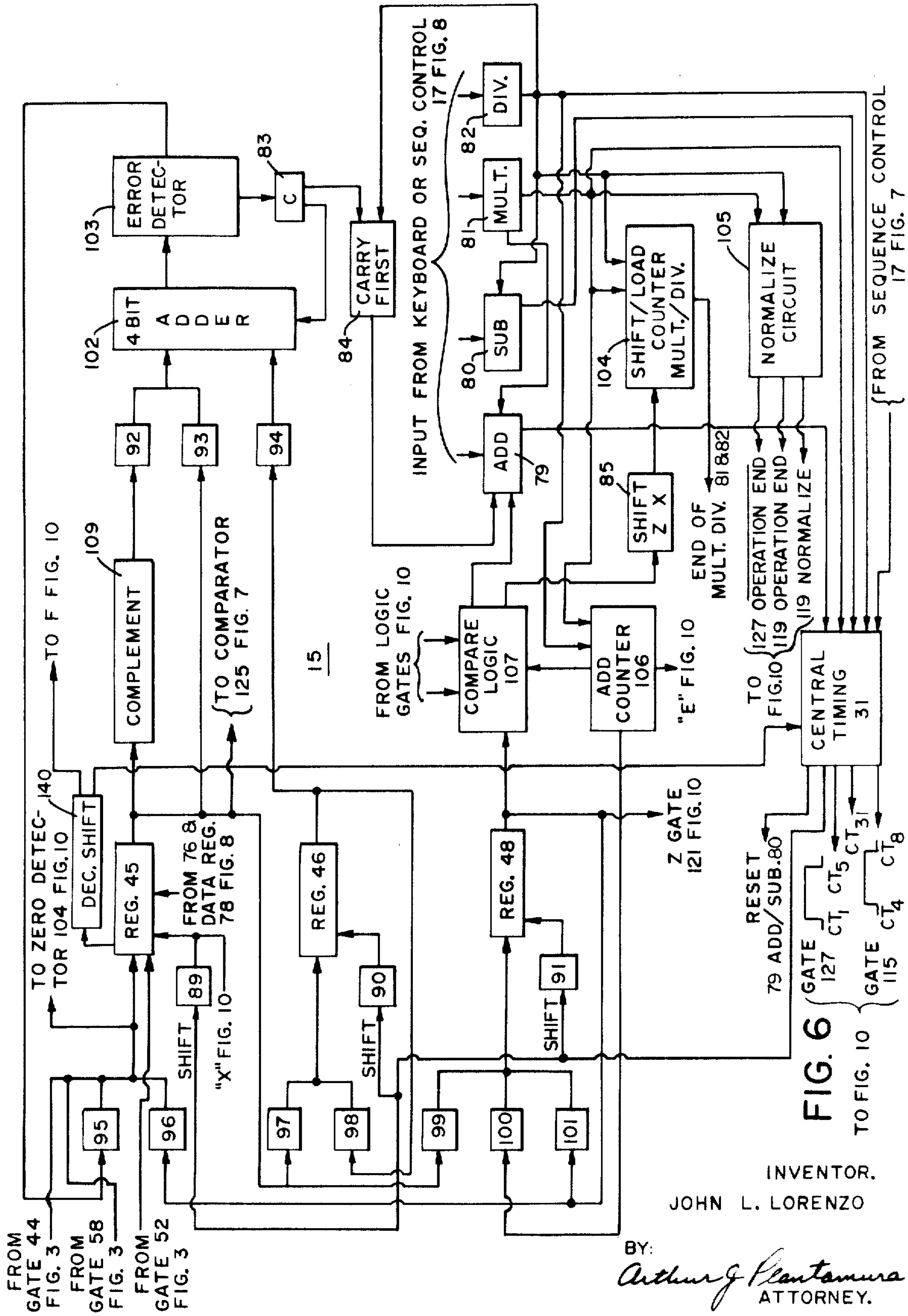
FIG. 6 is a block circuit diagram of part of the arithmetic unit employed to perform the basic arithmetic. calculations for the system of the invention.

The memory address is normally stored in register 45 in the arithmetic unit, FIG. 6; however, since this register also acts as the link for data between the other parts of the system (i.e., keyboard, time clock, job time units, and printer), it is necessary to transfer the address data from register 45 to register 46 temporarily while other data is passing through register 45. This shifting is accomplished via appropriate gating 89, 90, 97 controlled by the sequence control 17.

Operation of the system as a calculator requires the use of switches 25 in keyboard 11, and section 23 only. This capability of the system is an added feature which functions in the conventional manner of simple commercial calculators, performing the operations of addition, subtraction, multiplication and division.

The input from the source, of which coded cards are typical, is described by reference to FIG. 4. When a coded card 67 such as an employee's time card is inserted into the slot 68 of the time unit 13 and is pushed all the way to the bottom, light from lamp 69 is blocked from striking the light sensitive cell 70 of the photocell array 72; this in combination with any one of the other cells (to prevent false triggering of the system) being energized initiates a "record time" cycle. Also, as the card 67 reaches bottom, certain punched holes 71, see FIG. 5, in the card allow light from lamp 69 to pass through and impinge upon corresponding photocells in an array of photocells 72. A particular combination of holes in the card will cause a predetermined combination of cells that are unique to the card in question to be illuminated. The photocells are connected through appropriate interface circuitry 73 to a register 74 which temporarily stores the particular code designated by the holes in the card. The sequence control 17 (FIG. 8) is triggered through interface circuit 75 by the photocell 70 in the array 72. Several other means of detecting the card are feasible such as an electro-mechanical switch actuated by the bottom of the card, or detecting when any one of the photocells is not energized, i.e., not permitting a valid code when all cells are energized.

Figure 8:
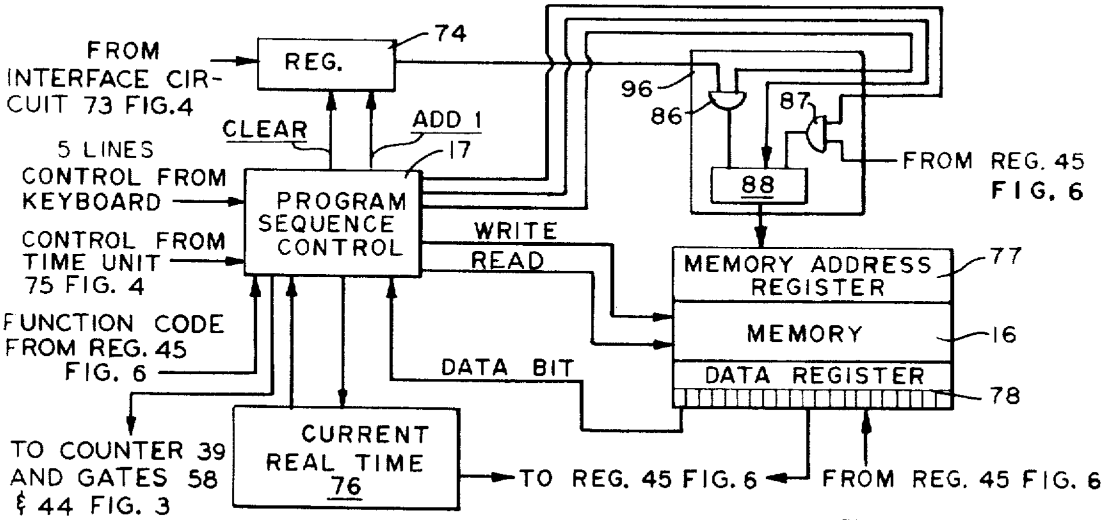
FIG. 8 is a block diagram illustrating the relationship of the sequence control, memory, real time, and card input in the system.

In FIG. 8 the program sequence control 17 causes the memory 16 to be read at the address which was set into register 74 when the card 67 was inserted by enabling the gate 86. The data, in the form of a 16-bit binary coded decimal word, thus obtained from the memory 16, and appearing in data register 78, is checked by noting whether a 1 or a 0 is present in a specified data bit of the word. A 1 would indicate presence of data, a 0 indicates no data in that location. In accordance with a feature of the invention, assuming a 0 is present in the data bit, the sequence control 17 then causes the current real time circuit 76 to enter the time along with a 1 into the data bit location in the word in register 45 (FIG. 6) in the arithmetic unit 15, which in turn sends the data to the data register 78 in the memory 16. The entire word is then written, by command from the sequence control 17, into the memory 16 which is still addressed at the same location set by the card 67 FIG. 4.

Figure 4:
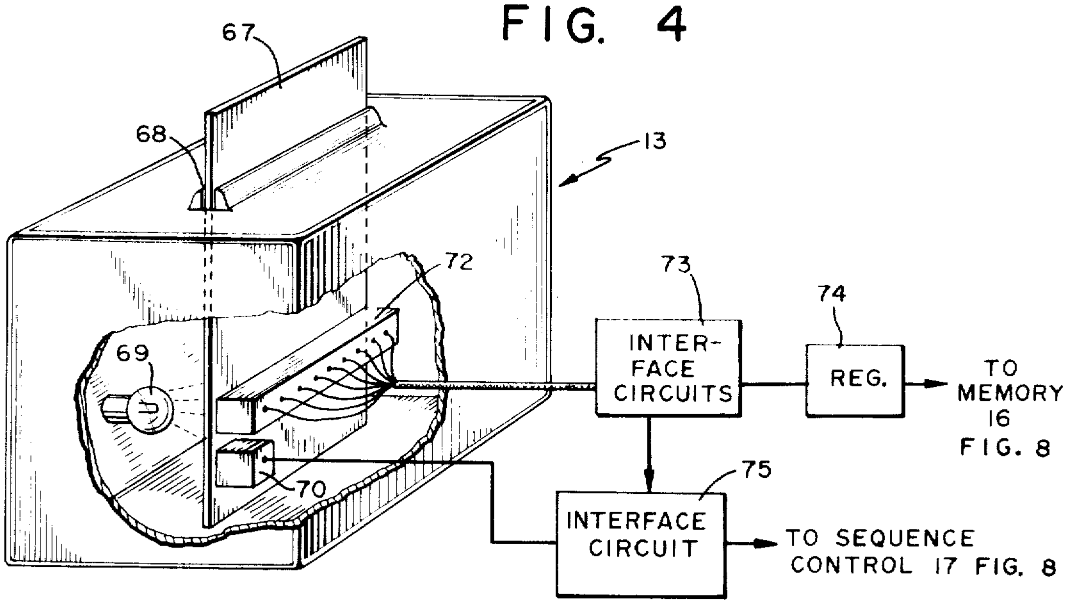
FIG. 4 illustrates schematically a time input unit, i.e., a time clock with a coded card inserted.
Figure 5:
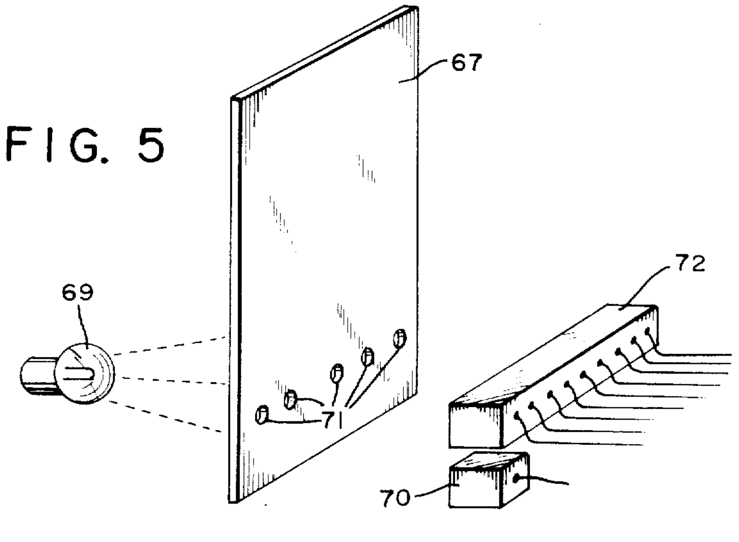
FIG. 5 is an enlarged fragmentary portion of the time input unit of FIG. 4.

At a subsequent time within a predetermined period, such as within a 24-hour period, when the same card is again inserted into the time unit 13, the program sequence control 17 is again caused to cycle by circuit 75 FIG. 4. The memory is read at the address stored in register 74 which was set up by the card 67. The word read from the memory appears in data register 78, and is checked for a data bit. Since there is data in that location as indicated by a 1 in the data bit location, this signal is sent through the data bit conductor to the sequence control 17 which directs the data from the data register 78 to the arithmetic unit register 45, FIG. 6. This operation causes data register 78 to be cleared (i.e., contain all zeros). The data from register 45 is then shifted into register 46. Next the sequence control 17 directs the current real time from the clock 76 shown in FIG. 8 to the register 45. The sequence control 17 sends a signal through the write conductor to the memory, causing the word (all zeros, including the data bit) in data register 78 to be written into the memory. That memory location is thus cleared.

The first time input held in register 46, is subtracted from the second input now in register 45, to give elapsed time; this difference is held in the register 45. In this manner, the illustrative embodiment of the invention automatically responds to successive data stimuli to compute automatically the elapsed time between every other data input from the same source or from respective individual card inputs.

In accordance with a further characteristic of the invention, the sequence control 17 (FIG. 8) next causes register 74 to change its least significant bit, thus changing the address code to the memory 16. Next, the memory 16 is given a read command from the sequence control 17 while at this new address, and any previously calculated cumulative time is transferred to the arithmetic unit register 45 (FIG. 6) while th previously calculated data held in register 45 is simultaneously transferred to register 46. The two times are then added in the four bit adder 102. The sum from register 45 is then transferred back to the memory data register 78 FIG. 8. This new cumulative time in data register 78 is then written into the memory 16 which is still being addressed by register 74 at the same location through enabled gate 86, address decode circuit 88, and the memory address register 77. The program sequence control 17 clears register 74 and resets itself, completing the cycle.

In accordance with a further feature of the invention and at the end of the predetermined period, such as 24 hours, sequence control 17 (FIG. 8) is caused to cycle by the clock 76. This cycle causes any or all memory locations which are used to store card insertion times to be cleared and set to zero. This operation is necessary to avoide erroneous calculations in the event that a card by inadvertence is not entered a second time in the period.

In FIG. 8, the memory 16 is an n-word, 16 bits per word, core memory commercially available such as Ferrox- cube Corporation's FI 3 series. Each word contains four binary coded decimal digits for the recording of real time in hours and minutes, two digits for hours and two for minutes. The most significant digit of the hours requires only 2 bits since it will represent 0, 1, or 2 (the maximum time recorded being 24:00 hours). The two remaining bits may be used for other data pertaining to that particular location. For example, one bit is used as the data bit to indicate presence or absence of data.

Also stored in the memory is the total cumulative time. This takes one and a half words, permitting the storage of up to 9,999 hours and 59 minutes. One word would therefore be shared between two other words. The first 8 bits to one, the last 8 bits to the other. Other items could be stored depending upon specific needs, and word length could be increased or decreased to suit particular requirements. Also, the maximum time recorded could be greater or less than the above mentioned 24:00 hours (military) time.

The memory is addressed by a binary coded n bit word entered into the address register 77 (FIG. 8). The address code may come from register 74, the sequence control 17, or the arithmetic unit register 45. Address steering 96, under control of the program sequence control 17 provides the necessary gating through gates 86 and 87 to direct the address to the address decoder 88 and then to the register 77. Data from the memory cores, after a read command, enters data register 78, from which it is transferred to register 45. Also data from register 45 to the memory enters the data register 78 prior to a write command. The read and/or write commands are controlled by the sequence control 17 or the keyboard. Any other type of memory could be used such as tape, disc, drum, optical, or semiconductor.

The arithmetic unit 15 (FIGS. 6 and 10) is part of the central processor 14, FIG. 1. The unit is capable of performing any of the four basic arithmetic operations of multiplication, division, addition, and subtraction. As will be apparent to one skilled in the art, by changes in the logic, it may also be modified to perform other operations that use as a base any combination of two or more of the four basic operations stated above.

Referring to FIG. 6, the arithmetic unit contains three registers, 45, 46, and 48. Registers 46 and 48 consist of eight four-bit words, while register 45 has nine four-bit words; the extra word is used for overflow detection and manipulation. Register 45 is also used as the holder of the final result of the operation performed and as the communication link with the rest of the system (keyboard 11, printer 19, input time clocks 12 and 13, storage 21, and memory 16). The information can be taken in and out of register 45 parallel or serial or a combination of the two. The other two registers 46 and 48 are used as extra storage and as part of the hardware necessary to perform the functions of the unit. The necessary shift to the registers is achieved by generation of twelve pulses in the central timing counter 31, see FIG. 6. These pulses are gated in to the registers through gates 89, 90, and 91. The controls to allow information in and our of the registers 45, 46, and 48 are achieved by the logic manipulation of gates 92 through 101 by their associated control lead from the sequence control. Other parts of the unit also shown are an adder 102, an error detector 103, counters 104, and 106, a comparator 107 and normalize circuit 105 which will be discussed in greater detail hereafter.

The registers 45, 46, and 48 are arranged for digital serial bit parallel operation using binary coded decimal code. The system may also be modified to operate in any other known code (for example, octal, hexadecimal, binary, excess 3, gray reflected, etc.) and the manipulation of the registers may be parallel, serial, or a combination of the two. The unit performs its operations using a fixed point arithmetic technique to allow decimal point shifting, but the system may also be modified in floating decimal point arithmetic by adding two more registers and an extra adder to service the exponent manipulations.

Figure 10:
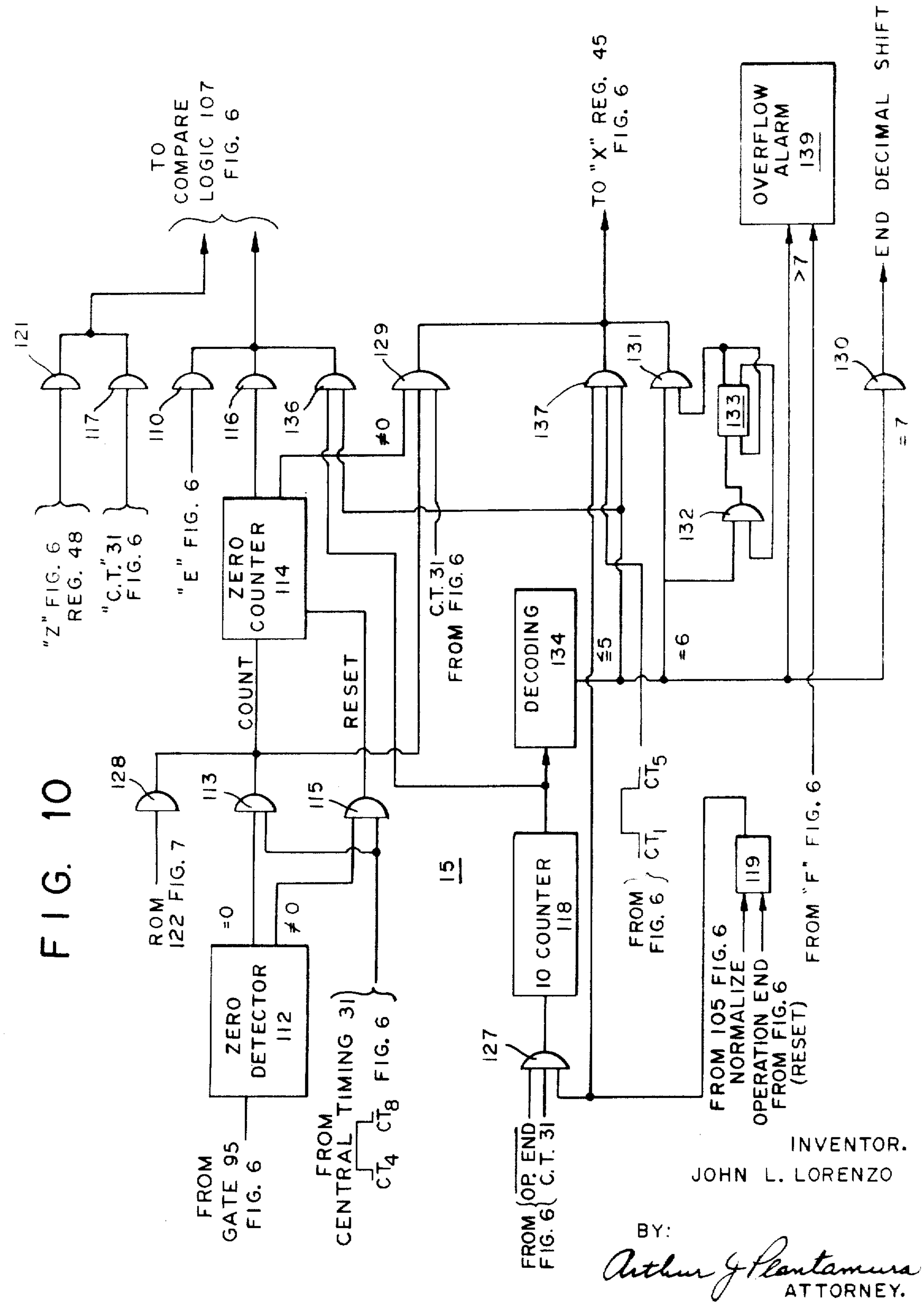
FIG. 10 is a schematic circuit diagram showing the part of the arithmetic unit used for decimal point manipulation in multiplication and division.

Referring to FIG. 6, addition is initiated by setting flip-flop 79 either from the keyboard or from a sequence control command. This in turn, through the sequence control, opens control gates 89, 90, 93, 94, 95 and 98, which allows the addition of the number in register 45 to the number in register 46. The digits are added one by one, in groups of four bits with each shift pulse through the adder 102. The error detector 103 and carry circuit 83 at the output of the adder detects a binary result larger than nine and converts it to its equivalent decimal; the result of the operation is loaded as the operation is performed into register 45; the content of register 46 is circulated in itself. The flip-flop 79 is reset by the end pulse from the group of 12 pulses from the central timer 31. In the event of overflow, the decimal shift circuit 140 causes the central timing circuit to shift the decimal to the extreme right thus eliminating the two least significant digits while increasing the most significant end of the number by two places. The next time overflow occurs, the overflow alarm 139, FIG. 10 is activated indicating unreliable results.

In subtraction the subtract flip-flop 80 is set similar to the add flip-flop 79, and the same conditions as in addition are set up except that gate 92 is open and gate 93 is closed. This allows subtraction to occur by addition of the of the rine's complement of the number in register 45 through complement circuit 109. The result is complemented again to get the final result. Again the substract flip-flop 80 is reset by the last timing pulse.

Multiplication, initiated by flip-flop 81, is performed using the method of repeated addition. Division, defined by flip-flop 82, utilizes the restoring method. Both methods are described fully in computer handbooks such as *Digital Computer Design Fundamentals* by Yaohan Chu, McGraw-Hill Book Company, New York, N.Y., 1962, pp. 65–66 and pp. 61–62.

Manipulation of the decimal point in multiplication and division is unique and is carried out generally as follows:

When loading a number into register 45 and before starting an operation, the decimal point is moved from the normal position, five places to the left. The number is then shifted to the left so that the most significant digit is in the farthest position left in the register while the number of places shifted is counted. The same procedure is carried out with the second number. The total number of places both numbers are moved to the left is stored to provide reference for final shift when the decimal point is returned to its normal location (preceding the two least significant digits).

In detail, the above described operation is carried out as follows: referring to FIGS. 6 and 10, register 45 is circulated through gate 93 circuits 102 and 103 and gate 95. During circulation the zero detector 112 detects a zero as it appears at the input of register 45. When a zero appears a pulse passes through gate 113 and causes zero counter 114 to count up one. When some digit other than zero appears at the input of register 45, the zero detector through gate 115 causes counter 114 to be reset to zero. This counting and resetting takes place from clock time 4 (CT4) to clock time 8 (CT8). During the first three clock times, CT1–CT3, the zeros are of no use in determing shift since if three or less digits are involved, the number will be located in the same position relative to the decimal as it was to begin with. After circulation the zero counter 114 will have stored in it the number of zeros which preceded the most significant digit of the number in register 45, which is the number of places to the left the number is to be shifted for normalization.

At the beginning of the next cycle, the count from central timing 31 is compared through gate 117 in compare logic 107 to the number stored in counter 114. When comparison occurs a normalize pulse is generated in circuit 105 (FIG. 6) setting flip-flop 119 (FIG. 10) which stops the countdown of the ten counter 118 through gate 127. Counter 118 starts at a ten count and is counted down once for every pulse from central timing 31 (FIG. 6). The remaining count in counter 118 is used to shift the result in register 45 (FIG 6) upon completion of the operation, through a path that includes decoding circuit 134 and the enabled gate 137.

On the next cycle from central timing 31, gate 128, FIG. 10, is enabled by a command from the read only memory 122 (FIG. 7), and counter 114 is allowed to count up to nine from where it had been set from counting zeros. This provides shift pulses through gate 129 to register 45 which will cause the number therein to be located the necessary number of places to the left by shifting the number to the right out through gates 93, etc., and back in through gate 95. The number thus normalized is shifted to register 46 as the next number enters register 45. The process is repeated and when both numbers are normalized, the count in counter 118 (FIG. 10) will determine the necessary final shift to the right of the result in register 45 after multiplication or division. At this time an operation end pulse is generated in circuit 105 (FIG. 6) which resets flip-flop 119.

Four conditions are defined by counter 118 through decoding circuit 134:

1. If the count is greater than seven, circuit 139 is set indicating overflow and causing an alarm to be activated.

2. If the count equals seven, gate 130 indicates no shift and the number is displayed with the decimal at the extreme right.

3. If the count equals 6, flip-flop 133 is set through gate 132 at which time one pulse is allowed to pass through gate 131. On the next clock pulse, flip-flop 133 is reset and gate 131 disabled. The one pulse through gate 131 causes the number in register 45 to be shifted one place to the right. Again no decimal point appears since the decimal point is at the extreme right.

4. If the count is equal to or less than 5, register 45 is allowed to shift right via gate 137 during clock time 1 through clock time 5, only if flip-flop 119 is in the set state, denoting that a comparison, between counter 118 through gate 136 and central timing 31 through gate 117, has been obtained. This comparison setting flip-flop 119 enables gate 137 which then passes the remaining pulses between CT1 and CT5. If comparison occurs after CT5 no output from gate 137 will occur and one of the other three conditions will prevail. Note that it is actually the five's complement which is passed through gate 137. For example, if counter 118 were at one, comparison would occur at CT1, flip-flop 119 would be set allowing CT2–CT5, four pulses, to pass through gate 137 and shift register 45 four places to the right. When the count in counter 118 is five or less, the decimal point will be located in its normal location, i.e., to the left of the two least significant digits. Note that the ability of the system to shift the decimal point to the extreme right provides an extended range of two orders of magnitude at the sacrifice of the tenths and hundredths places. This feature is preferred because if a number is in the millions the fractions are usually insignificant.

In both FIGS. 6 and 10, as well as elsewhere, conventional control signals and clock inputs to various gates and circuits have been eliminated for the sake of clarity; (e.g. the line labled control code in FIG. 7 may contain 20, 30 or more individual control conductors); it will be understood by those skilled in the art that these various control signals and clock pulses are necessary for proper sequencing and operation. See FIG. 11–1, *Digital Computer Design Fundamentals*, by Yoahan Chu, supra, for example. Also, it will be apparent to those skilled in the art that the arithmetic unit may be modified to perform its operations using any of the known methods such as those noted for example in Chu, *Digital Computer Design Fundamentals*, supra, Chapter 1, pp. 15–50, Chapter 2, pp. 57–87, Chapter 12, pp. 430–451, or *The Logic of Computer Arithmetic*, by Ivan Flores, Prentice-Hall, Englewood Cliffs, N.J., 1963. The arithmetic unit 15 can also be controlled by the sequence control unit 17 in relation to the manipulation of data related to the rest of the system.

Thus, the arithmetic unit is part of the central processor 14. It can perform arithmetic operations when commanded either as a calculator from the keyboard 11 or when commanded to do so from the sequence control 17. The unit is also used for storage and manipulation of data from other parts of the system such as input time clock 12 or 13, keyboard 11, memory 16, or printer 19, when commanded to do so from the sequence control 17.

The sequence control unit 17 (FIG. 7) is a part of the central processor 14, FIG. 1. It defines the controls for registers 45, 46, and 48, and the input/output gates of the arithmetic unit 15, as well as giving commands to perform any of the four operations (addition, subtraction, multiplication, and division) that the arithmetic unit is capable of performing.

The sequence control 17 also provides commands for the memory 16 (read or write), the printer, communication link 20, storage 21, and commands to other sequence control subunits 120. As hereinbefore mentioned, the printer 19 can be caused to respond to control signals by printing an output that has direct utility as, for example, checks, pay statements, job cost analyses and payroll sheets.

Figure 7:
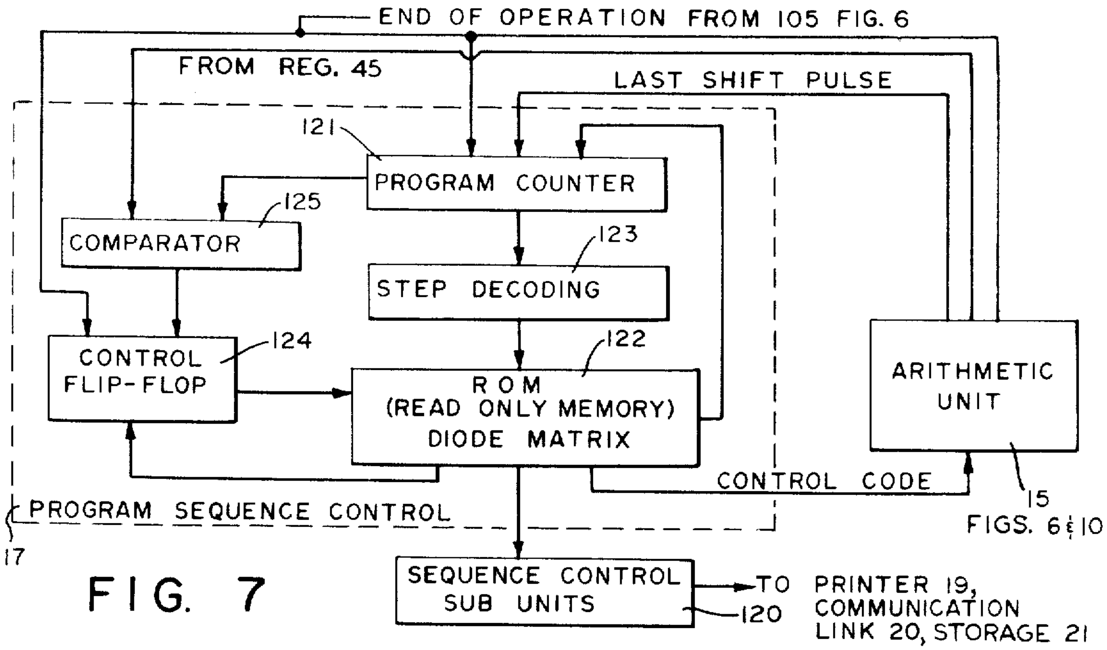
FIG. 7 is a block diagram of the sequence control unit shown in relation to the arithmetic unit of FIG. 6 and FIG. 10.
Figure 9:
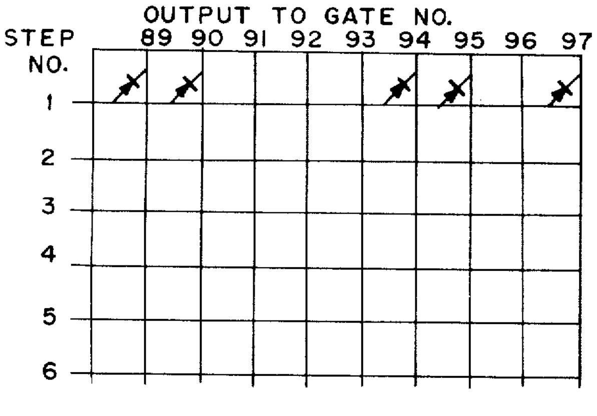
FIG. 9 is a diagram of the diode matrix used as a read-out memory in the sequence control section.

The sequence control unit 17 (FIG. 8) contains, as shown in FIG. 7, a binary program counter 121, a read only memory 122 (for illustration a diode matrix is shown in FIG. 9), a set of decoding gates 123 defining the steps in relation to a particular line in the diode matrix 122, a control flip-flop 124, and a comparator 125. When a function is called to be performed from the keyboard 11 or from the time clock input 12 or 13, a start item or a code defining that particular sequence appears in register 45, FIG. 6, in the arithmetic unit 15. The counter 121 starts counting until the comparator 125 shows a comparison between the step of the counter and the code for the function to be performed; at this point a control flip-flop 124 is set, allowing the code of the diode matrix 122 to be transmitted to the arithmetic unit 15.

The capacity per counter step of the read only memory, diode matrix, is determined by the amount of gates to be controlled, one bit or one position is required for each control gate, one for each arithmetic operation, two for memory control, one for the printer, and as many as may be required for other sequence control subunits. Additionally, one bit is employed to define the last step in the sequence to reset the program counter 121 and control flip-flop 124. Once comparison is achieved, the stepping control for the program counter is defined by one complete shift of the registers 45, 46, and 48 (twelve pulses), or by the end of operation if the code is associated with one of the four basic operations +, −, ×, ÷. The positions of the diodes in the matrix 122 are determined by the operation or the gate to be controlled. For example, referring to FIG. 9, if the step requires the interchange of data in register 45 and 46, (FIG. 6) gates 89 and 90 need to be opened to allow the shift pulses to clock the registers. Also, in order to allow the information to be transferred, gates 94, 95, and 97 must be opened. If the outputs of that particular part of the matrix are designated by the gate numbers which are controlled, then as viewed from step No. 1, a diode would be placed in position 89, 90, 94, 95, and 97, as shown in FIG. 9. This configuration is a conventional circuit, and more fully described in Chu, *Digital Computer Design Fundamentals*, supra, Chapter 9, pp. 318–337.

The program counter 121 is stepped by the last (twelfth) pulse from the central timing counter 31, FIG. 6. Program counter 121 and the read only memory 122 are capable of being expanded as the need for new functions and new steps is required. The read only memory could be an MOS read only memory, a delay line, core memory, or any electronic or mechanical device capable of holding various codes.

It is thus seen that the system of the invention has a variety of advantageous capabilities and features such as:

1. Recall of data stored from the same source on entry of new data.
2. Simultaneous computation of time difference on recall.
3. Recall of accumulated time and addition of new elapsed time.

4. Checking a memory address to determine if data is present. If it is, compute; if it is not, store the time the memory was checked at that address.

5. Clearing of memory locations at the end of 24 hours to prevent erroneous cumulative time if a card is inadvertently not checked out during that work period.

Figure 2:
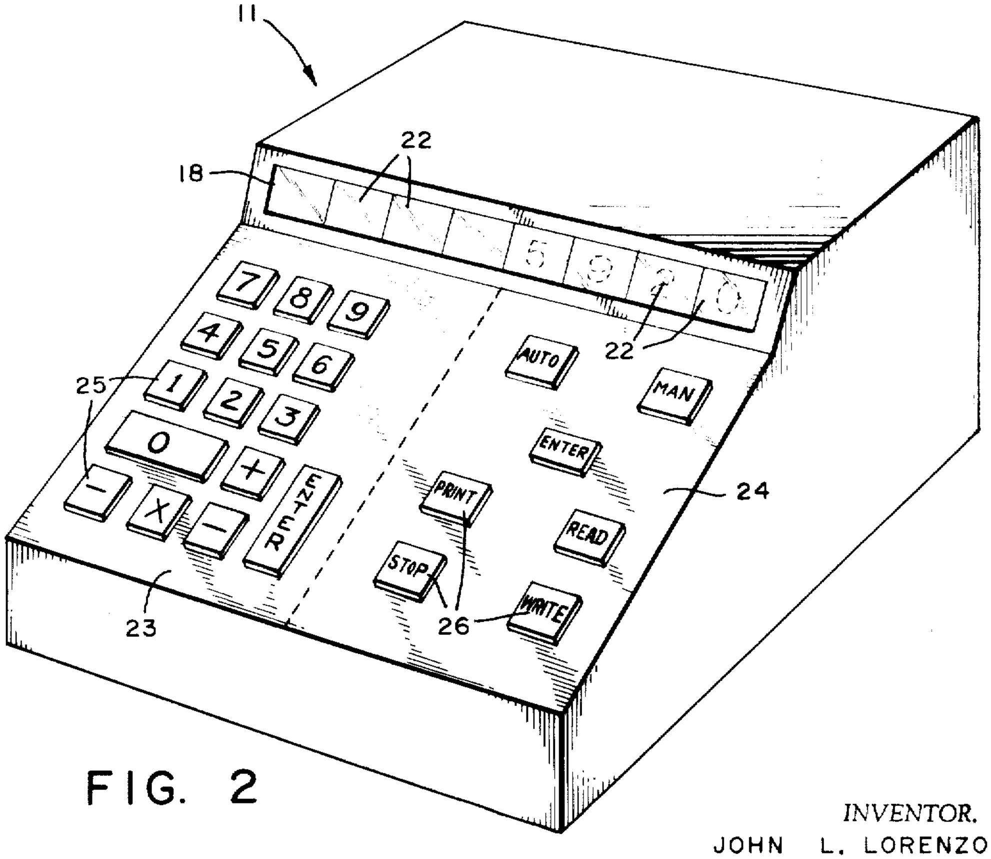
FIG. 2 illustrates a keyboard of the kind used in the invention.

By way of example, in a typical automatic operation, first the auto switch 34 is depressed to select the automatic mode. Next the data print-out start item number is selected through operation of the keys 25 (FIG. 2). This item is loaded automatically into the right half of the register 36, as viewed in FIG. 3. Through manipulation of the enter switch 37, the item is transferred to the left half of the register 36 by means of the control gating 38.

The start item is then displayed, appearing in the left side of display 18, FIG. 2. Again keys 25 are employed to enter the desired end of print number into register 36. This second number will appear in the right half of display 18. Thus, after entry of the second number, the display 18 will show in the left half, the number of the employee or job which will be first printed out, and in the right half, the number of the employee or job which will end the print out. Data related to these employees or jobs as well as all employees or jobs between these limits will be automatically printed out in numerical sequence when the print switch 41 and read switch 42 are depressed simultaneously. After printout of the end of print item, the operation ends. At any time during printout the sequence may be terminated by depressing the stop print switch 43.

While certain specific details have been described for the purpose of optimum presentation of the advantageous freatures of the invention, various modifications will be apparent to those skilled in the art without departing from the scope or spirit of the invention. For example, while a punched card format has been disclosed as the coded time input mechanism, those skilled in the art will appreciate that alternate mechanism or data sources may be used for this purpose, such as a magnetic coded card, a combination of employee identification card and job identification card, etc.

1. A real time recording and computing system comprising: a real time input means for generating a sequence of coded time inputs;

a memory for receiving and storing said coded time inputs generated by said input means;

an arithmetic computing mechanism for calculating time differentials between sequential real time inputs within a predetermined time period and storing said time differentials in said memory;

a sequence control to recall from said memory previously stored real time inputs and to initiate in said computing mechanism time difference computations based on said (coded) time inputs; and means to automatically print out data based on said computed time differences.

2. The system of claim 1 wherein the arithmetic computing mechanism for calculating the real time differentials includes means for automatically multiplying said differentials by multipliers and wherein said memory stores said multiplied differentials.

3. The system of claim 2 which incorporates a visual display of said real time differentials and of the product obtained by multiplying said differentials with multipliers.

4. The system of claim 1 in which the real time input means comprises a time clock and includes, as a standby unit for auxiliary operation, a manual keyboard.

5. The system of claim 4 wherein the clock is disposed at a location remote from said keyboard.

6. The system of claim 1 which incorporates means for increasing capacity of the arithmetic unit and display by moving the decimal point to the extreme right.

7. A circuit for measuring real time differences comprising means for registering a first real time input unique to a specific entry source which is applied to the circuit, means for withdrawing said registered time input automatically in response to the registration of a second real time input subsequently introduced to the circuit by said specific entry source and means for producing a signal representative of the elapsed time between said first and second real time inputs.

8. A circuit according to claim 7 further comprising means for summing elapsed times derived from a plurality of first and second real time inputs.

9. A circuit according to claim 7 further comprising means for signalling the absence of entry of a second real time input and means for eliminating said first time input registration in the absence of registration of a second real time input within a predetermined period of time.

10. A method for measuring and storing time-dependent data comprising the steps of recording a first real time from a uniquely identifiable source, thereafter recording a second real time from said uniquely identifiable source, automatically recalling said first recorded time and subtracting said first time from the second recorded time to produce an elapsed time representation and automatically storing said elapsed time.

* * * * *